United States Patent Office 3,190,882
Patented June 22, 1965

3,190,882
AMIDOMETHYLATION OF OLEFINS
William D. Schaeffer, Pomona, Calif., assignor to Union Oil Company of California, Los Angeles, Calif., a corporation of California
No Drawing. Filed Aug. 14, 1961, Ser. No. 131,109
18 Claims. (Cl. 260—268)

This invention relates to the amidomethylation of olefinic compounds and to the product obtained thereby.

This invention is based on my discovery that olefinic compounds can readily be amidomethylated in high yields and purity with various acidic catalysts. Although it has been known that aromatics can be amidomethylated with acid catalysts, it heretofore was not expected that the amidomethylation reaction could be used to produce amidomethylated olefin derivatives.

The resulting amidomethylated compounds are useful intermediates for the production of a variety of valuable products. They may, for example, be hydrolyzed to form alkenyl or alkanol amines having two functional or reactive sites useful as intermediates for polymers, ion exchange resins, etc. Reduction of the alkenyl intermediates presents a method of preparing their carbinyl amines.

Olefinic compounds which are readily amidomethylated in accordance with my invention are, in general, compounds free of interfering functional groups which correspond to the general structure:

$$HC(R_1)=C(R_2)R_3$$

wherein $R_1$, $R_2$ and $R_3$ are selected from the class consisting of hydrogen, alkyl, nitroalkyl, carboxyalkyl and mixtures thereof; and the total of carbon atoms of said olefin are between about 2 and 25.

Examples of suitable olefinic compounds are the following: ethylene, propylene, butene, isobutene, nitropentene, 2,3-dimethyl butene, hexene, heptene, 2-ethyl-1-pentene, 3-methyl-2-pentene, diisobutene, decene, 4-butyl-2-hexene, 6-nitro-1-undecene, octadecene, docosene, etc.; unsaturated fatty acids such as acrylic acid, crotonic acid, tiglic acid, myristoleic acid, hypogaeic acid, oleic acid, abeitic acid, etc.

The amidomethylation reaction whereby the aforedescribed olefinic compounds are substituted proceeds as follows:

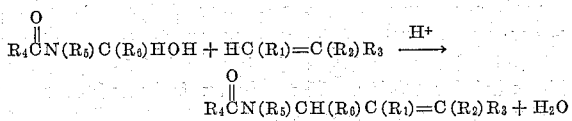

The N-methylolamide reactant of the preceding equation is prepared in a conventional manner by reacting a carboxylic acid amide with an aldehyde as follows:

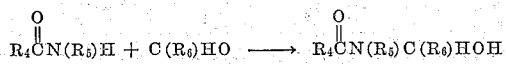

In general, any carboxylic acid amide free of interfering functional groups can be employed wherein $R_4$ may be a primary or secondary methylolamide such as another —$NRCH_2OH$, hydrogen, alkyl group such as methyl, ethyl, propyl, isopropyl, butyl isobutyl, hexyl, dodecyl, etc.; and $R_5$ may be hydrogen; an alkyl such as methyl, ethyl, propyl, isopropyl, butyl, isobutyl, hexyl, dodecyl; or an alkylol radical such as formyl, acetyl and the like.

As used herein, the term N-methylolamide is generic to N-methylolamides wherein $R_6$ is hydrogen, and to N-methylolamides having an alkyl or aryl substituent in the methylol group. The preparation of these N-methylolamides from a carboxylic acid amide and an aldehyde such as formaldehyde, acetaldehyde, propanol, butanol, tolualdehyde, etc., is well known in the art and hence is not described in further detail.

In any of the foregoing permutations, the terminal ends of the $R_4$ and $R_6$ radicals can be joined together to form a cyclic amide or imide. Suitable examples include N-methylol formamide, N-methylol acetamide, N-methylol propionamide, N-methylol-N-methyl formamide, N-methylol-N-methyl acetamide, N-methylol diacetamide, N-methylol succinimide, bis-methylol urea, N-methylol 2,5-diketo-piperazene, and the like. The preferred class of N-methylolamides is represented by the formula:

wherein $R_4$ is hydrogen or a lower alkyl radical having 1 to about 6 carbons, and said N-methylolamide is derived from the reaction of formaldehyde with the corresponding carboxylic acid amide.

The amidomethylation step is conducted in the presence of a strong acid catalyst, which is non-oxidizing and does not react with the substrate materials. I have found the following catalysts suitable: sulfuric acid of a strength between about 50 and 100 volume percent, anhydrous hydrofluoric acid, trifluoroacetic acid, aryl and alkyl sulfonic acids having between one and about 8 carbons, such as, benzene sulfonic acid, toluene sulfonic acid, methane sulfonic acid, ethane sulfonic acid, propane sulfonic acid, butane sulfonic acid, etc.

The aqueous sulfuric acid, anhydrous hydrofluoric acid and trifluoroacetic acid catalysts are employed in liquid phase and suitably serve as the reaction media. A solvent, however, is employed with the sulfonic acid catalysts and optically the solvent can also be used with the sulfuric, hydrofluoric and trifluoroacetic acid catalysts. This solvent can suitably be any inert, i.e., non-ionized compound such as dioxane, diethyl ether, dibutyl ether, methyl butyl ketone, sulfur dioxide, etc.

The aforedescribed catalyst and optional solvents are employed to obtain alkenyl amides in accordance with the preceding equation.

I have also discovered that the amidomethylation reaction can be directed to production of alkyl ester amides by the addition of an alkanoic acid to the system. The reaction is then expressed as follows:

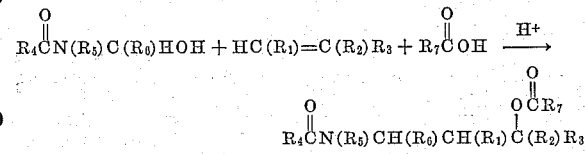

wherein $R_1$ through $R_6$ are as previously described and

represents the alkanoic acid and is selected from the following: carboxylic acids such as acetic acid, propionic acid, butyric acid, isovaleric acid, valeric acid, caproic acid, enanthic acid, capyrlic acid, perlargonic acid, capric acid, etc.

Only relatively mild reaction conditions are needed for the amidomethylation reaction which is conducted in the liquid phase at temperatures between about 0° to about 200° C. Temperatures between about 10° and 120° C. are preferred, especially when using the more active catalysts such as hydrogen fluoride, trifluoroacetic acid, and methane sulfonic acid. Slightly higher temperatures can be used for the less active catalyst, e.g., 50° to 200° C.

In general pressures between about 1 and 20 atmospheres are employed; preferably the pressure employed is the minimum necessary to maintain the reactants in liquid phase at the reaction temperatures; however, the pressure is not critical to the process and higher pressures can be used if desired.

Under the aforementioned conditions of temperature and catalyst, the reaction will ordinarily be completed in about 10 minutes to 2 hours. This reaction time, however, is not universal for all olefins. In the manner apparent to those skilled in the art, the amidomethylation rate of any particular olefin can be determined by periodic withdrawal of samples for routine analysis such as boiling point, refractive index, rate of disappearance of a reactant by means of other physical means such as infra-red spectra, nuclear magnetic resonance, etc.

In general, it is preferred to employ a slight excess of the olefinic reactant, as any excess of this reactant is easier to remove than excess N-methylolamide reactant. To effect the reaction, the desired reactants are simply agitated together until the reaction is complete. In a preferred modification, the N-methylolamide is added gradually to the olefin-catalyst mixture, in order to avoid undesired side reactions. This modification is particularly desirable when higher temperatures are employed, which sometimes tend to cause two molecules of the N-methylolamide to react with each other, eliminating water and forming a diamido ether or a methylene bis-amide.

The amidomethylated product can be recovered by several methods. When using volatile acid catalysts such as hydrogen fluoride and trifluoroacetic acid, the product is readily separated by distillation. With non-volatile acids such as the sulfonic acids, separation is best accomplished by quenching the reaction mixture in water and filtering off the aqueous solution of catalyst which can be concentrated for reuse. Where a solvent is employed in the reaction zone it is preferably removed by distillation prior to quenching.

While the alkanol amide and alkylene amide reaction products are useful for a variety of chemical intermediates, their greatest value is an intermediate in the formation of primary amines. As previously mentioned, the amine is readily prepared by simple hydrolysis of the amide formed.

The conditions for hydrolysis of amides to amines are well known and are applicable to the amidomethylated products of my invention. In general, any strong acid or base catalyzes the hydrolysis. The acid hydrolysis of the alkylene amide product yields the alkenyl ammonium salt as follows:

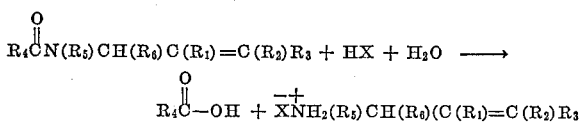

acid hydrolysis of the alkyl ester amide product yields the alkanol ammonium salt as follows:

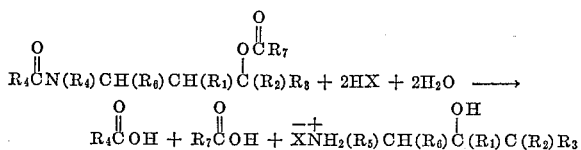

wherein the R groups are as previously described and HX represents a strong mineral acid such as hydrochloric, sulfuric, etc., having a strength between about 5 and 35 weight percent. The hydrolysis temperature is between about 100 and 250° C. and sufficient pressure is used to maintain a liquid phase.

The hydrolysis product can be recovered in any suitable manner, e.g., the system can be evaporated to remove water and the non-volatile portion extracted with an organic solvent to recover the $R_4COOH$ carboxylic acid and $R_7COOH$ condensing agent for reuse in the process. The purified alkanol or alkylene ammonium salt can then be added to an aqueous solution of an alkali, e.g., sodium potassium, ammonium hydroxides, etc., to form the free amine which is insoluble in the aqueous system and can be separaated therefrom by conventional means, e.g., filtration, decantation, etc.

Bases can also be used to hydrolyze the amide products directly to the amine. In general, the amidomethylated olefin product can be added to an aqueous solution of an alkali, e.g., sodium, potassium or ammonium hydroxide of about 5 to 50 weight percent strength and the admixture heated to between about 100° and 250° C. under sufficient pressure to maintain a liquid phase for about 5 minutes to 3 hours. The amine can readily be separated from the aqueous phase by filtration, decantation, extraction, etc. The aqueous residue is thereafter treated to recover carboxylic acids, $R_4COOH$ and $R_7COOH$, for reuse in the process. When aqueous ammonia is employed as the hydrolysis media, the aqueous residue is distilled under reduced pressure, 10 to 600 millimeters of mercury, to recover the carboxylic acid amide which is then reacted with formaldehyde to form the N-methylolamide reactant for the process. The lower molecular weight amides which are stable at their atmospheric boiling point, acetamide, propionamide, butyramide, etc., can of course be distilled at atmospheric pressure if desired. When alkalis are used to catalyze the amide hydrolysis, the aqueous residue can be acidified to yield the carboxylic acids which can be separated by extraction for reuse.

In a preferred embodiment, the alkanoic acid used as a condensing agent in the formation of the previously described alkyl ester amides corresponds to the carboxylic acid portion of the N-methylolamide reactant, i.e., $R_7$ and $R_4$ are the same radicals. This embodiment eliminates the need to purify two carboxylic acids from the aqueous residue of the acid or base catalyzed hydrolysis.

When carboxylic acids of dissimilar $R_7$ and $R_4$ radicals are used, it is within the scope of my invention to conduct the alkyl ester amide hydrolysis in two steps. In the first step, mild conditions are used, e.g., acid or base catalysts at temperatures between about 25° and 150° C. so as to hydrolyze the ester portion and yield the $R_7$ acid or salt. This product is then separated from the aqueous system by suitable methods, e.g., extraction. Thereafter the hydrolysis temperature can be increased and/or the strength of the acid or base catalyst increased so as to hydrolyze the amide to the amine or ammonium salt. The amine is thereafter recovered in the appropriate manner previously described.

My invention will now be described by the following examples which are intended for illustration only and are not to be construed as unduly limiting of the invention:

Example 1

To a 200 milliliter flask fitted with a reflux condenser is added 90 milliliters of acetic acid, 10 grams of p-toluene sulfonic acid, 25 milliliters of 1-hexene and 17.8 grams of N-methylolacetamide. The mixture is heated to reflux temperature (about 115° C.) and then 5 milliliters of acetic anhydride is added. After a six-hour reflux period, the mixture is cooled and poured into an excess of cold dilute potassium hydroxide solution (6 N). After extracting the aqueous mixture twice with 75 milliliter portions of ethyl ether, the combined extracts are evaporated under vacuum to yield 11 grams of liquid residue. Infrared spectroscopy and elemental analysis indicate the product to be N-acetoxyheptyl-acetamide.

When the experiment is repeated with methanesulfonic acid in acetic acid and 80° C. for one hour a 58 percent yield of N-acetoxyheptyl-acetamide is obtained. Similar results are obtained when octene is amidomethylated to N-acetoxynonyl-acetamide.

Example 2

To a 250 milliliter flask equipped with a reflux condenser, stirrer and thermometer is added 16.8 grams of 1-hexene and 50 milliliters of trifluoroacetic acid. The mixture is stirred and 17.8 grams of N-methylolacetamide is added dropwise. During addition, the temperature slowly rises. After addition of the N-methylolacetamide is completed, the flask is heated to 80°–85° C. for one hour. Thereafter unreacted 1-hexene and excess trifluoroacetic acid are removed by evaporation under vacuum. The residue is poured into dilute potassium hydroxide and twice extracted with 100 milliliter portions of ethyl ether. The extracts are combined and evaporated to yield 22 grams of N-heptenylacetamide corresponding to a 71 percent yield.

When the experiment is repeated with 70 volume percent sulfuric acid at 30° C. for 30 minutes, substantially the same results are obtained.

When hexene is amidomethylated with a catalyst comprising 10 grams hydrogen fluoride in 70 grams of sulfur dioxide in a pressure bomb for one hour and 25° C., a 22 percent yield of N-heptenylacetamide is obtained.

Example 3

To a 250 milliliter flask equipped with a stirrer, thermometer, reflux condenser and inlet tube are added 60 milliliters of trifluoroacetic acid. Propylene is passed through the inlet tube at about one liter per minute while 17.8 grams of N-methylolacetamide are slowly added over a ten minute period. After addition, the flask is heated to 70° C. and maintained at this temperature for 30 minutes. Excess trifluoroacetic acid is evaporated from the flask under vacuum and the residue is added to dilute potassium hydroxide. The resultant solution is extracted three times with 75 milliliter portions of ethyl ether, the extracts combined and evaporated by yield 13 grams of N-butenylacetamide.

Example 4

Oleic acid is amidomethylated by adding 28.2 grams of oleic acid to 30 milliliters of trifluoroacetic acid in a 250 milliliter flask. To the stirred mixture is slowly added 9.0 grams of N-methylolacetamide and the resultant mixture thereafter heated to 50° C. for one hour. After one hour the flask contents are poured into ice water. The product is purified and found to be an amidomethylated oleic acid in about a 95 percent yield. Substantially the same yields can be obtained when 7.5 grams of N-methylolformamide or 10.3 grams of N-methylol-N-methyl acetamide are employed in lieu of N-methylolacetamide

Example 5

Diisobutylene is amidomethylated by adding 22.4 grams of the hydrocarbon to 80 milliliters of trifluoroacetic acid in a 250 milliliter flask. To the stirred mixture is added 18 grams of N-methylolacetamide and the reactants are maintained at about 60° C. for one hour and then poured onto crushed ice. The mixture is neutralized with potassium hydroxide to yield a two-phase system. The organic phase is extracted with benzene and the extract concentrated to obtain about an 84 percent yield of N-nonenylacetamide. Substantially the same yields are obtained when 23.6 grams of bis-methylol urea, 23.0 grams of N-methylol succinimide or 29.0 grams of N-methylol 2,5-diketo-piperazine are used in lieu of the N-methylolacetamide reactant, the respective products being N-nonenyl-N'-methylol urea and N-nonenyl 2,5-diketo piperazine.

Example 6

To illustrate the hydrolysis of the amidomethylated olefin products, 10 grams of N-heptenylacetamide are added to 150 milliliters of concentrated (28 percent) ammonium hydroxide solution in a 300 milliliter pressure bomb. The bomb is heated to 175° C. for 90 minutes, then cooled and the contents removed and extracted with ethyl ether to recover primary heptenyl amine. The aqueous residue containing ammonium acetate is heated to 180° C. under reduced pressure to distill over and recover acetamide for reuse in the process.

I claim:
1. A method for preparing unsaturated amides which comprises contacting a monoolefin having the following formula:

$$HC(R_1)=C(R_2)R_3$$

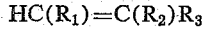

wherein $R_1$, $R_2$ and $R_3$ are selected from the class consisting of hydrogen, alkyl, nitroalkyl and carboxyalkyl and the total carbon atoms of said monoolefin are between 2 and about 25 with an N-methylolamide at a reaction temperature between about 0° and about 200° C. in the presence of an acidic condensing catalyst selected from the class consisting of anhydrous hydrogen fluoride, trifluoroacetic acid, sulfuric acid having a strength between about 50 and 100 volume percent, alkyl and aryl sulfonic acids having 1 to about 8 carbon atoms, and mixtures thereof; and thereafter recovering said unsaturated amide product.

2. A method as defined in claim 1 wherein said N-methylolamide is N-methylolformamide.
3. A method as defined in claim 1 wherein said N-methylolamide is N-methylolacetamide.
4. A method as defined in claim 1 wherein said acidic condensation catalyst is anhydrous hydrogen fluoride.
5. A method as defined in claim 1 wherein said acidic condensation catalyst is trifluoroacetic acid.
6. A method as defined in claim 1 wherein said acidic condensation catalyst is methane sulfonic acid employed in a liquid reaction medium comprising a solvent inert to said olefin under said reaction conditions.
7. A method as defined in claim 1 wherein said acidic condensation catalyst is sulfuric acid having a strength between about 60 and 80 volume percent.
8. A method for the preparation of an amido ester which comprises contacting a monoolefin having the following formula:

$$HC(R_1)=C(R_2)R_3$$

wherein $R_1$, $R_2$ and $R_3$ are selected from the class consisting of hydrogen, alkyl, nitroalkyl and carboxyalkyl and the total carbon atoms of said monoolefin are between 2 and about 25 with an N-methololamide and an alkyl carboxylic acid at a reaction temperature between about 0° and about 200° C. in the presence of an acidic condensing catalyst selected from the class consisting of anhydrous hydrogen fluoride, trifluoroacetic acid, sulfuric acid having a strength between about 50 and 100 volume percent alkyl and aryl sulfonic acids, and mixtures thereof; and thereafter recovering said alkyl ester amide.

9. A method defined by claim 8 wherein said alkanoic acid is acetic acid and said N-methylolamide is N-methylolacetamide.
10. A method as defined in claim 8 wherein said N-methylolamide is N-methylolformamide.
11. A method as defined in claim 8 wherein said acidic condensation catalyst is anhydrous hydrogen fluoride.
12. A method as defined in claim 8 wherein said acidic condensation catalyst is trifluoroacetic acid.
13. A method as defined in claim 9 wherein said acidic condensation catalyst is methane sulfonic acid.
14. A method as defined in claim 8 wherein said acidic condensation catalyst is sulfuric acid having a strength between about 60 and 80 volume percent.
15. The method of preparing an amine which comprises contacting a monoolefin having the following formula:

$$HC(R_1)=C(R_2)R_3$$

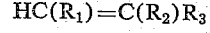

wherein $R_1$, $R_2$ and $R_3$ are selected from the class consisting of hydrogen, alkyl, nitroalkyl and carboxyalkyl and the total carbon atoms of said monoolefin are between 2 and about 25 with an N-methololamide at a reaction temperature between about 0° and about 200° C. in the presence of an acidic condensing catalyst selected from the class consisting of anhydrous hydrogen fluoride, trifluoroacetic acid, sulfuric acid having a strength between about 50 and 100 volume percent, alkyl and aryl sulfonic acids having between about 1 and about 8 carbon atoms, and mixtures thereof; thereafter separating an amidomethylated olefin product from said catalyst and contacting said amidomethylated olefin with water at a temperature between about 100° and 250° C. to hydrolyze said product and form said amine.

16. The method defined by claim 15 wherein said amine is an alkanolamine and said amidomethylation is conducted in the presence of an alkanoic acid.

17. The method defined by claim 15 wherein said hydroylsis is conducted at a temperature between about 100 and 250° C. in an aqueous phase containing ammonium hydroxide.

18. The method defined by claim 17 wherein the amine product is separated from said aqueous phase, said aqueous phase is thereafter heated under reduced pressure to distill overhead a carboxylic acid amide and said carboxylic acid amide is reacted with an aldehyde to regenerate said N-methylolamide.

No references cited.

IRVING MARCUS, *Primary Examiner.*
DUVAL T. McCUTCHEN, *Examiner.*